US010710702B2

(12) United States Patent
Davis (10) Patent No.: US 10,710,702 B2
(45) Date of Patent: Jul. 14, 2020

(54) SHAPE ADAPTIVE AIRFOIL (71) Applicant: Aviation Partners, Inc., Seattle, WA (US)

(72) Inventor: Edward Davis, Enumclaw, WA (US)

(73) Assignee: Aviation Partners, Inc., Seattle, WA (US)

( * ) Notice: Subject to any disclaimer, the term of this patent is extended or adjusted under 35 U.S.C. 154(b) by 290 days.

(21) Appl. No.: 15/674,919

(22) Filed: Aug. 11, 2017

(65) Prior Publication Data

US 2018/0043985 A1 Feb. 15, 2018

Related U.S. Application Data (60) Provisional application No. 62/374,464, filed on Aug. 12, 2016.

(51) Int. Cl.
*B64C 3/48* (2006.01)
*B64C 13/04* (2006.01)
*B64C 23/06* (2006.01)
*B64C 3/44* (2006.01)

(52) U.S. Cl.
CPC ............ *B64C 3/48* (2013.01); *B64C 13/0425* (2018.01); *B64C 23/072* (2017.05); *B64C 2003/445* (2013.01); *Y02T 50/162* (2013.01); *Y02T 50/164* (2013.01)

(58) Field of Classification Search
CPC ... B64C 23/065; B64C 23/076; B64C 23/063; B64C 23/069
See application file for complete search history.

(56) References Cited

U.S. PATENT DOCUMENTS

| | | | |
|---|---|---|---|
| 2,223,335 A * | 11/1940 | Stewart | B64C 3/48 244/219 |
| 3,836,099 A | 9/1974 | O'Neill et al. | |
| 5,388,788 A | 2/1995 | Rudolph | |
| 5,988,563 A * | 11/1999 | Allen | B64O 3/42 244/49 |
| 7,900,877 B1 * | 3/2011 | Guida | B64C 23/076 244/199.4 |
| 7,918,421 B2 | 4/2011 | Voglsinger et al. | |
| 8,256,719 B2 | 9/2012 | Wood et al. | |

(Continued)

OTHER PUBLICATIONS

PCT/US2017/025375 filed Mar. 31, 2017 International Search Report and Written Opinion dated Jun. 20, 2017.

*Primary Examiner* — Nicholas McFall
*Assistant Examiner* — Terri L Filosi
(74) *Attorney, Agent, or Firm* — Rutan & Tucker LLP (57) ABSTRACT

An apparatus and method are provided for a shape adaptive airfoil configured to be coupled with a tip of an airplane wing. In one embodiment, the shape adaptive airfoil is a blended winglet comprised of a base section coupled with the airplane wing, a blade section projecting in a vertical direction above the base section, and a radius section interconnecting the base and blade sections. Adaptive control structures may be incorporated into leading and trailing edges of the base section and the blade section. The adaptive control structures of the base section may facilitate changing a camber profile of the shape adaptive airfoil. The adaptive control structures of the blade section may enable changes to a toe angle of the blade section.

21 Claims, 4 Drawing Sheets (56) References Cited

U.S. PATENT DOCUMENTS

| | | | |
|---|---|---|---|
| 2007/0018049 A1* | 1/2007 | Stuhr | B64C 23/069 |
| | | | 244/124 |
| 2012/0091283 A1 | 4/2012 | Uchida et al. | |
| 2014/0064979 A1* | 3/2014 | Colling | B63B 1/248 |
| | | | 416/223 R |

* cited by examiner

SHAPE ADAPTIVE AIRFOIL

PRIORITY

This application claims the benefit of priority to U.S. patent application Ser. No. 62/374,464, filed Aug. 12, 2016, which is incorporated by reference in its entirety into this application.

FIELD

The field of the present disclosure generally relates to aeronautical vehicle systems. More particularly, the field of the invention relates to an apparatus and a method for a shape altering airfoil.

BACKGROUND

Current aircraft designs utilize a variety of airfoils on wings, horizontal stabilizers, canards, rotor blades, vertical stabilizers, and a variety of other structures consisting primarily of relatively fixed airfoil surfaces. Flying surfaces generally must be optimized for specific applications such as low-speed handling or improved high-speed aerodynamics. Aircraft configured to operate in several performance environments must often adopt airfoil surfaces that provide suitable characteristics in multiple environments. Such a compromise, however, typically diminishes the overall performance of the aircraft, as well as diminishing performance in specific flight conditions.

Conventional configurations often limit modification of the flying surfaces to that which may be achieved by way of mechanical moving surfaces. Mechanical actuators and linkage systems are utilized to effectuate changes in the airfoil surfaces to allow for enhanced low-speed flight and limited autopilot maneuvering. Military aircraft have utilized mechanically swept wings for improved aerodynamics during high speed flight. Although movable airfoil components may have a substantial effect on the aerodynamic flight characteristics of the airfoil, the shapes of the airfoil components generally are fixed. As such, further optimizing airfoils for performance over a larger range of the flight envelope typically requires incorporating additional airfoil components as well as all those certain components necessary to move the additional airfoil components. Including additional moveable airfoil components tends to be unappealing, however, due limited space and weight requirements associated with most aircraft.

Shape adaptive airfoils are an improved approach whereby the configuration of the airfoil may be optimized throughout the flight envelope of the aircraft. Modifying the shape of the airfoil enables the configuration of the airfoil to be optimized over most of the flight conditions of the aircraft. An optimized airfoil may provide better lift characteristics at lower speeds to allow greater take-off weight while providing lower drag at high speed to achieve a greater flight range. Thus, a modifiable airfoil capable of being optimized throughout the flight envelope is believed to provide improvements to aircraft performance.

BRIEF DESCRIPTION OF THE DRAWINGS

The drawings refer to embodiments of the present disclosure in which.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first airfoil," may be made. However, the specific numeric reference should not be interpreted as a literal sequential order but rather interpreted that the "first airfoil" is different from a "second airfoil." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes an apparatus and a method for a shape adaptive airfoil configured to be coupled with a tip of an airplane wing. In one embodiment, the shape adaptive airfoil is a blended winglet comprised of a base section coupled with the airplane wing, a blade section projecting in a vertical direction above the base section, and a radius section interconnecting the base and blade sections. Adaptive control structures are incorporated into leading and trailing edges of the base section and the blade section. The adaptive control structures of the base section facilitate changing a camber profile of the shape adaptive airfoil. The adaptive control structures of the blade section enable changes to a toe angle of the blade section. Each of the adaptive control structures is comprised of a skin overlap on a first side and a flexible surface on a second side of each of the base and blade sections. The skin overlaps and the flexible surfaces allow movement of the adaptive control structures relative to the base section and the blade section.

Figure 1:
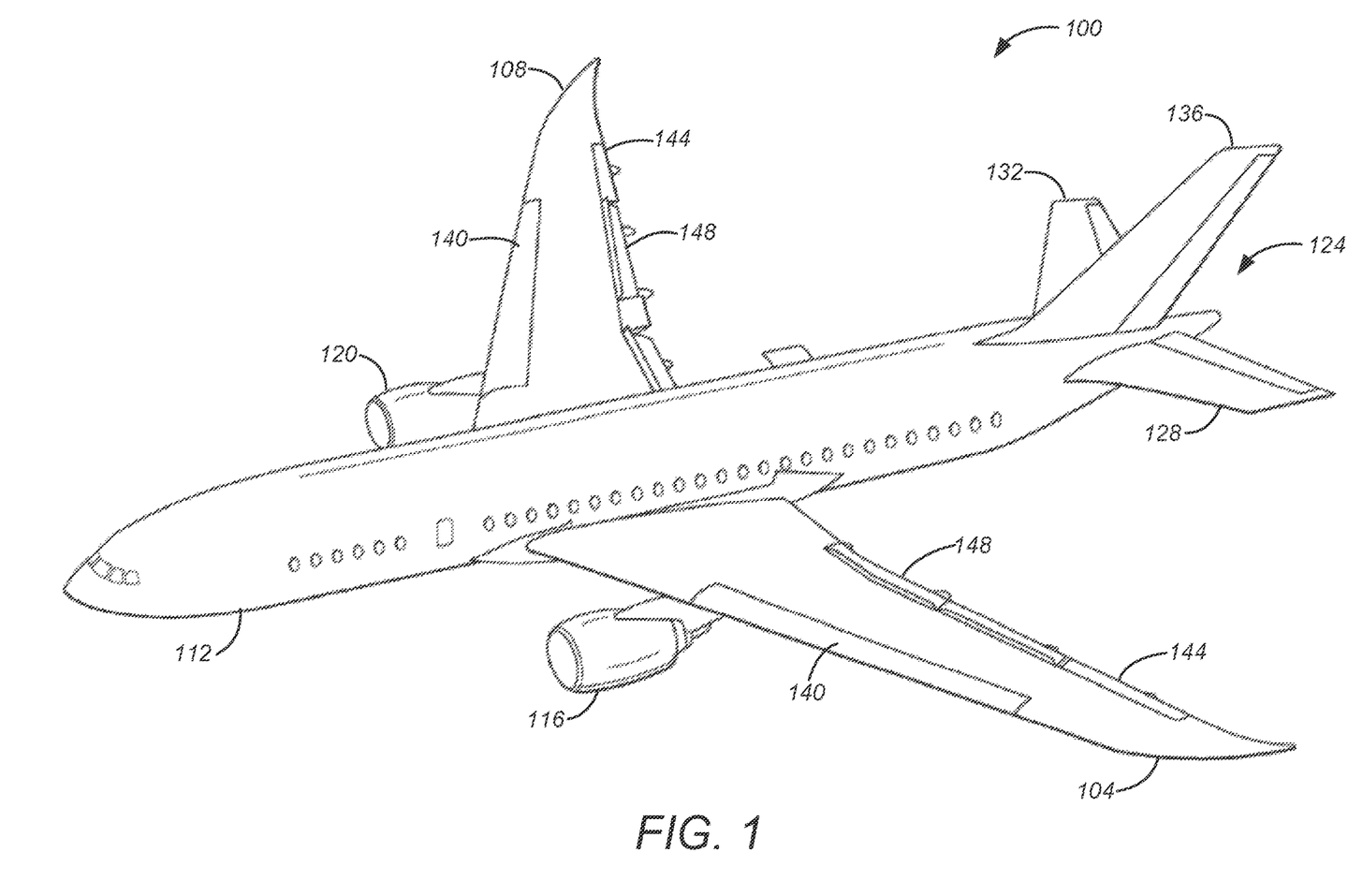
FIG. 1 illustrates a perspective view of an exemplary aircraft suitable for implementation of shape adaptive airfoils in accordance with the present disclosure.

FIG. 1 illustrates a perspective view of an exemplary aircraft suitable for implementation of shape adaptive airfoils in accordance with the present disclosure. The aircraft 100 comprises a first wing 104 and a second wing 108 attached to a body 112. An engine 116 is coupled with the first wing 104, and an engine 120 is coupled with the second wing 108. The body 112 includes a tail section 124 that is comprised of a first horizontal stabilizer 128, a second horizontal stabilizer 132, and a vertical stabilizer 136.

It should be understood that the illustration of the aircraft 100 in FIG. 1 is not meant to imply physical or architectural limitations to the manner in which an illustrative configuration may be implemented. For example, although the aircraft 100 is a commercial aircraft, in other embodiments the aircraft 100 may be a military aircraft, rotorcraft, helicopter, unmanned aerial vehicle, spaceplane, or any other suitable aircraft. Moreover, although the illustrative examples for an exemplary embodiment are described with respect to an aircraft, an illustrative embodiment may be applied to other types of platforms. The platform may be, for example, a mobile platform, a stationary platform, a land-based structure, an aquatic-based structure, and a space-based structure. More specifically, the platform, may be a surface ship, a train, a spacecraft, a submarine, an automobile, a power plant, a windmill, a manufacturing facility, a building, and other suitable platforms configured to interact with exterior fluids such as atmospheric air or water.

As shown in FIG. 1, slats 140 are disposed along a leading edge of the first and second wings 104, 108. The slats 140 generally enable a pilot to alter the performance characteristics of the aircraft 100 by manipulating the nose camber of the wings 104, 108. In some embodiments, however, leading edge devices other than the slats 140 may be incorporated into the aircraft 100. For example, leading edge devices may include fixed slots, nose flaps, Kruger flaps, cuffs, and other similar devices. In general, the slats 140 extend along the leading edges of the wings 104, 108 forward and downward, thereby keeping air flowing over the wings at slower speeds.

Figure 2:
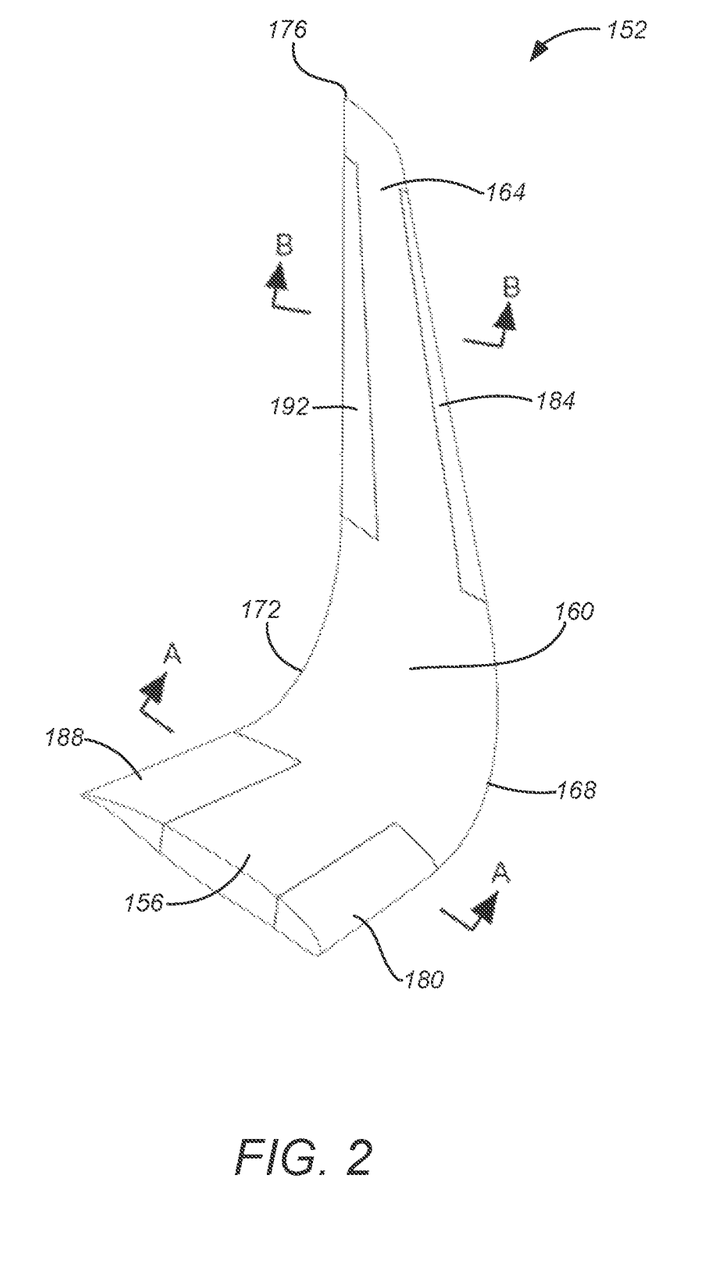
FIG. 2 illustrates a perspective view of an exemplary embodiment of a blended winglet comprised of multiple shape adaptive control structures and configured to be coupled with a tip of an airplane wing.

Coupled with a trailing edge of each of the first and second wings 104, 108 are ailerons 144 and trailing edge flaps 148. As will be appreciated, the ailerons 144 enable the pilot to control rolling of the aircraft 100. The trailing edge flaps 148 preferably are of the Fowler variety that enable the pilot to manipulate the performance of the aircraft 100 by altering the camber and cord of the first and second wings 104, 108. In some embodiments, any of various wing tip devices may be disposed at the extremal tips of the first and second wings 104, 108. As best illustrated in FIG. 2, an exemplary embodiment of a blended winglet 152, configured to be disposed at the tip of the first wing 104, is comprised of a base section 156, a radius section 160, and a blade section 164. The base section 156 attaches to and is functionally an extension of the wing 104. The blade section 164 projects in a vertical direction above the base section 156 of the blended winglet 152. The radius section 160 is a generally curved portion that interconnects the base and blade sections 156, 164.

Although only the first wing 104 is specifically discussed below in connection with FIGS. 2-6, it should be understood that substantially identical structures and mechanisms are to be disposed at the tip of the second wing 108, as well. Moreover, it should be understood that the blended winglet 152 is exemplary and thus the shape adaptive airfoils discussed herein may be incorporated into a wide variety of wing tip devices, including, but not necessarily limited to, various blended winglets, standard unblended winglets and wing fences, spiroids, split winglets, raked wing tips, and the like.

As shown in FIG. 2, a leading edge 168 of the first wing 104 extends along the base section 156, the radius section 160, and upwards along the blade section 164. Similarly, a trailing edge 172 of the first wing 104 extends along the base, radius, and blade sections 156, 160, 164. The leading edge 168 and the trailing edge 172 terminate at a winglet tip 176 atop the blade section 164. Multiple shape adaptive control structures are incorporated into the leading and trailing edges 168, 172 of the blended winglet 152 and are configured to operate in addition to the control structures discussed above with respect to FIG. 1. Specifically, leading edge control structures 180 and 184 are respectively disposed along the leading edge 168 of the base section 156 and the blade section 164. Trailing edge control structures 188 and 192 are respectively disposed along the trailing edge 172 of the base section 156 and the blade section 164. It is contemplated that incorporating the leading edge control structures 180, 184 and the trailing edge control structures 188, 192 into wing tip devices, such as the blended winglet 152 facilitates a variety of performance goals. It should be recognized, however, that the control structures 180, 184, 188, 192 need not all be practiced simultaneously. Rather, in some embodiments, the leading edge control structures 180, 184 may be practiced in absence of the trailing edge control structures 188, 192. In some embodiments, the trailing edge control structures 188, 192 may be practiced in absence of the leading edge control structures 180, 184. Further, it is contemplated that various control structures may be incorporated in locations of the wing tip device, other than as shown in FIGS. 2-6, so as to serve a variety of desired performance goals, without deviating beyond the spirit and scope of the present disclosure.

Figure 3:
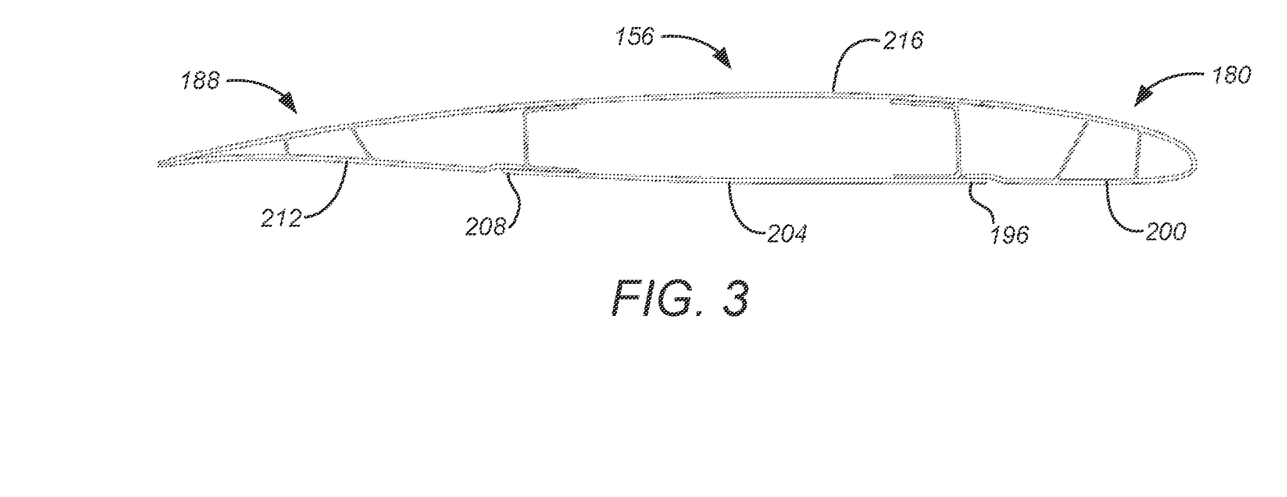
FIG. 3 is a cross-sectional view of a base section of the blended winglet of FIG. 2, taken along a line A-A, illustrating a cruise configuration of the shape adaptive control structures.

FIG. 3 is a cross-sectional view of the base section 156, taken along line A-A of FIG. 2, illustrating the leading and trailing edge control structures 180, 188 essentially aligned with a plane of the base section 156. As will be appreciated, the alignment of the control structures 180, 188 with the base section 156 is a neutral disposition of the blended winglet 152 that comprises a typical cruise configuration. During operations other than cruising of the aircraft 100, such as taking off and landing, the configuration of the blended winglet 152 may be advantageously changed into a high lift configuration, illustrated in FIG. 4, wherein the leading and trailing edge control structures 180, 188 are moved downward. As will be appreciated, moving the trailing edge control structure 188 downward operates similarly to lowering a flap, and moving the leading edge control structure 180 downward performs similarly to a moveable slat. Thus, lowering the leading and trailing edge control structures 180, 188 increases the camber of the blended winglet 152, thereby increasing aerodynamic lift.

A leading skin overlap 196 allows a lower surface 200 of the leading edge control structure 180 to slide over a lower surface 204 of the base section 156. Similarly, a trailing skin overlap 208 allows a lower surface 212 of the trailing edge control structure 188 to slide over the lower surface 204. Flexibility of an upper surface 216 of the base section 156 allows a suitable internal actuator to pull the control structures 180, 188 from the cruise configuration, shown in FIG. 3, into a cambered configuration, as shown in FIG. 4.

As will be appreciated, the portions of the lower surfaces 200, 212 comprising the leading and trailing skin overlaps 196, 208 preferably are in sliding contact with the lower surface 204, whereby the lower surfaces 200, 212 pass over the lower surface 204 and extend into an interior of the base section 156. In some embodiments, however, either or both of the skin overlaps 196, 208 may be comprised of a skin break or a skin gap. It is contemplated, therefore, that in some embodiments, edges of the lower surfaces 200, 212 and the lower surface 204 may not share sliding relationships, but rather may be moved adjacently to one another so as to allow the internal actuator to pull the base section 156 into the cambered configuration, as described above.

As will be appreciated, wing tip devices tend to shift airload distribution of the wing 104 outboard, thereby increasing the bending moment and torsion loads acting on the wing. The increased bending moment and torsion can result in a need for structural reinforcement of the wing 104 so as to reduce the fatigue life of the wing. The trailing edge control structure 188 may be used to mitigate this concern. For example, at times of high loading, during either maneuver or gust induced loads, it may be advantageous to deploy the trailing edge control structure 188 upwardly so as to spoil the lift over the winglet 152 and greatly reduce the loads experienced by the wing 104.

Figure 4:
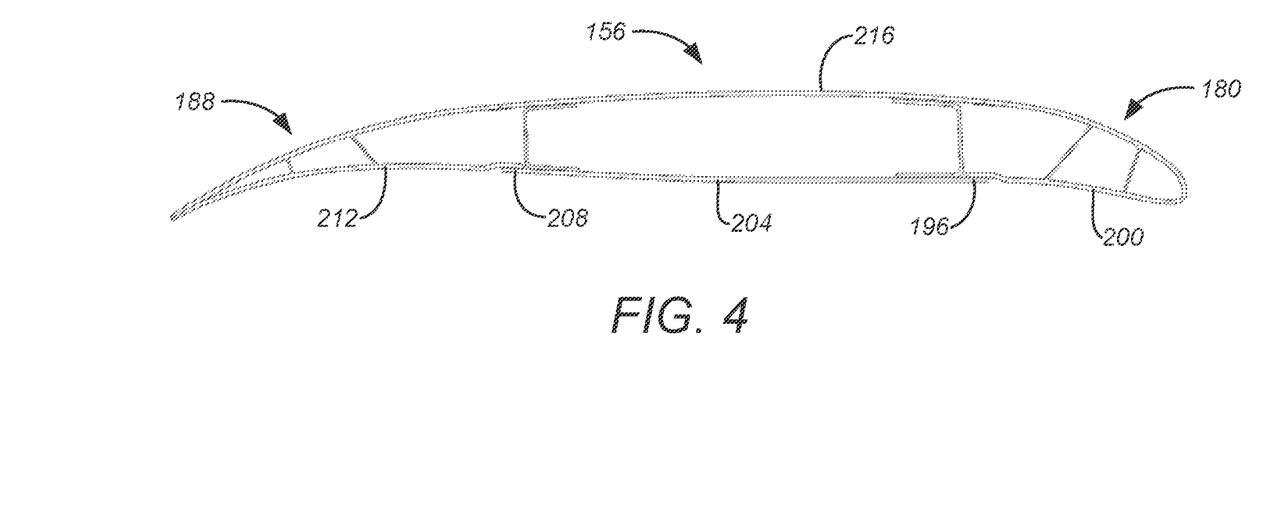
FIG. 4 is a cross-sectional view of the base section of the blended winglet of FIG. 2, taken along line A-A, illustrating a high lift configuration of the shape adaptive control structures.
Figure 5:
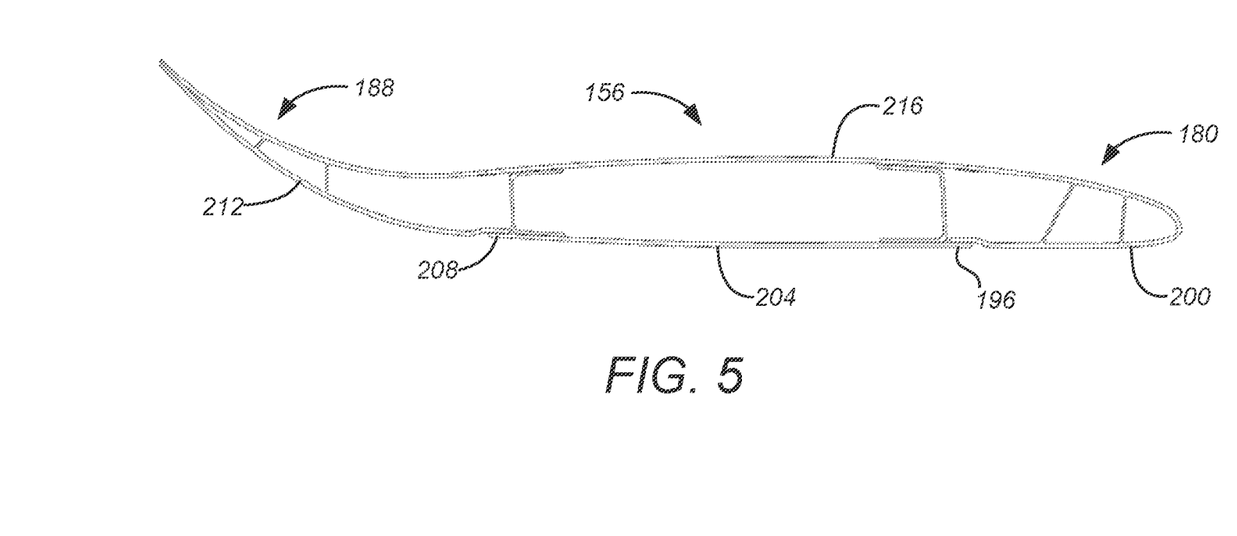
FIG. 5 is a cross-sectional view of the base section of the blended winglet of FIG. 2, taken along line A-A, illustrating a raised configuration of a trailing edge control structure that operates to reduce structural loads acting on a wing.

As such, it should be recognized that the leading and trailing edge control structures 180, 188 are not limited to downward movement as shown in FIG. 4, but rather either or both of the leading and trailing edge control structures 180, 188 may be moved upwardly, as desired. For example, FIG. 5 is a cross-sectional view of the base section 156, taken along line A-A of FIG. 2, illustrating the trailing edge control structure 188 in a raised configuration while the leading edge control structure 180 remains in a neutral configuration with respect the plane of the base section 156. As will be appreciated, the dramatically raised configuration of the trailing edge control structure 188 operates to spoil the lift acting over the winglet 152, thereby greatly reducing structural loads imparted to the wing 104.

It is contemplated that in many cases the actuation and control of shape adaptive wing tip devices may be largely independent of existing control devices of the aircraft 100, as discussed in connection with FIG. 1. In some embodiments, however, high lift functions of wing tip devices, such as the blended winglet 152, may be manually actuated by the pilot, or may be coordinated to automatically deploy into advantageous configurations based on the flap settings selected by the pilot. Further, in some embodiments, a toe angle of the blade section 164 may also be manually selected by the pilot, or the toe angle may be automatically selected based on various aircraft parameters, such as altitude or engine power setting. It is further contemplated that load alleviation functions may be automated based on a variety of inputs from sensors located on the aircraft 100, or on the wing tip devices, such as, by way of non-limiting example, acceleration, aircraft gross weight, aircraft speed, and the like.

As will be appreciated, the angular orientation of the blade section 164 of the winglet 152, as well as with other wing tip devices, with respect to the airstream is an important parameter. Changing the toe angle of the blade section 164 to toe the winglet 152 inward is known to greatly benefit the performance of the winglet, but may also result in an increased loading on the winglet 152 and the wing 104. It is contemplated that manipulating the toe angle of the blade section 164 may advantageously reduce structural loading of the winglet 152 and the wing 104. For example, during heavy loading of the aircraft 100 as occurs due to high gross weight or relatively large accelerations, the blade section 164 may be toed-out to reduce structural loads. Alternatively, when the aircraft 100 is lightly loaded or in cruise, the blade section 164 may be toed-in so as to enhance performance.

Figure 6:
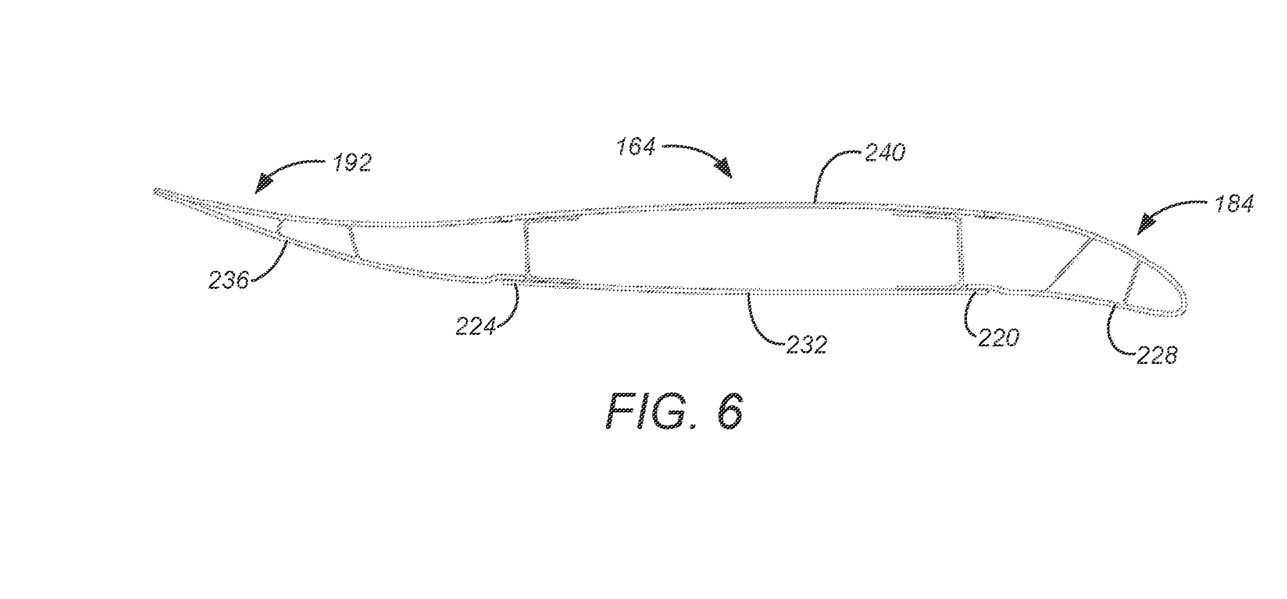
FIG. 6 is a cross-sectional view of a blade section of the blended winglet of FIG. 2, taken along a line B-B, illustrating a toe-out configuration of the blade section to reduce structural loading of the blended winglet of FIG. 2.

FIG. 6 is a cross-sectional view of the blade section 164, taken along line B-B of FIG. 2 and oriented toward the winglet tip 176, illustrating a toe-out configuration of the blade section that reduces structural loading of the winglet 152 and the wing 104. In the toe-out configuration, the leading edge control structure 184 is moved in an outboard direction while the trailing edge control structure 192 is moved in an inboard direction. Alternatively, a tow-in configuration of the blade section 164 may be achieved by moving the leading edge control structure 184 in the inboard direction and moving the trailing edge control structure 192 in the outboard direction.

As shown in FIG. 6, a leading skin overlap 220 enables movement of the leading edge control structure 184, and a trailing skin overlap 224 allows movement of the trailing edge control structure 192. The skin overlaps 220, 224 are substantially similar to the skin overlaps 196, 208, discussed in connection with FIGS. 3-5, with the exception that the skin overlaps 220, 224 are disposed on an outboard surface of the blade section 164. The leading skin overlap 220 allows an outboard surface 228 of the leading edge control structure 184 to slide over an outboard surface 232 of the blade section 164. The trailing skin overlap 224 allows an outboard surface 236 of the trailing edge control structure 192 to slide over the outboard surface 232. Flexibility of an inboard surface 240 of the blade section 164 allows a suitable internal actuator to move the control structures 184, 192 so as to manipulate the toe angle of the winglet 152, as desired.

The portions of the outboard surfaces 228, 236 comprising the skin overlaps 220, 224 preferably are in sliding contact with the outboard surface 232 of the blade section 164. Thus, in the illustrated embodiment of FIG. 6, the outboard surfaces 228, 236 pass over the outboard surface 232 and extend into an interior of the blade section 164. It is contemplated, however, that in some embodiments either or both of the skin overlaps 220, 224 may be comprised of a skin break or a skin gap. For example, in some embodiments, edges of the outboard surfaces 228, 236 and the outboard surface 232 may not share sliding relationships, but rather may be moved adjacently to one another so as to allow one or more internal actuators to change the toe angle of the blade section 164, as described above.

It should be understood that any of the shape adaptive airfoils, such as the control structures 180, 184, 188, 192, may be operated by way of a variety of actuators, including, but not limited to, hydraulic actuators, electrical actuators, pneumatic actuators, and any of various mechanical couplings comprised of control cables, push rods, torque tubes, or any combination thereof. Further, logic control of the shape adaptive airfoils comprising the wing tip device may be incorporated into an existing flight control computer. In some embodiments, however, an independent controller may be used to control the shape adaptive airfoils. As will be appreciated, an independent controller may be located anywhere on the aircraft 100, including within the wing tip devices.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A shape adaptive airfoil configured to be coupled with a tip of an airplane wing, the shape adaptive airfoil comprising:
    a base section including a first leading edge control structure and a first trailing edge control structure;
    a blade section projecting in a vertical direction above the base section and comprising a second leading edge control structure and a second trailing edge control structure; and
    a radius section separating the first leading edge control structure of the base section from the second leading edge control structure of the blade section.

2. The shape adaptive airfoil according to claim 1, wherein the base section is placed in a neutral disposition by aligning the first leading edge control structure and the first trailing edge control structure with a plane of the base section.

3. The shape adaptive airfoil according to claim 2, wherein the base section is placed in a high lift disposition by moving the first leading edge control structure and the first trailing edge control structure downward relative to the plane of the base section.

4. The shape adaptive airfoil according to claim 1, wherein a leading skin overlap allows a lower surface of the first leading edge control structure to slide over a lower surface of the base section, and wherein a trailing skin overlap allows a lower surface of the first trailing edge control structure to slide over the lower surface of the base section.

5. The shape adaptive airfoil according to claim 4, wherein a flexibility of an upper surface of the base section allows one or more internal actuators to move the first leading edge control structure and the first trailing edge control structure relative to the base section to change a camber of the base section.

6. The shape adaptive airfoil according to claim 5, wherein portions of the leading skin overlap and the trailing skin overlap are configured for sliding contact with the lower surface of the base section, whereby the portions are configured to extend into an interior of the base section.

7. The shape adaptive airfoil according to claim 1, further comprising a dedicated actuation and control mechanism.

8. The shape adaptive airfoil according to claim 7, wherein the dedicated actuation and control mechanism is designed and positioned to be manually operated by a pilot.

9. The shape adaptive airfoil according to claim 8, wherein a flap setting selected via the dedicated actuation and control mechanism automatically deploys the shape adaptive airfoil into an optimal configuration.

10. The shape adaptive airfoil according to claim 1, wherein a toe angle of the blade section changes by moving the second leading edge control structure and the second trailing edge control structure relative to a plane of the blade section, the toe angle affecting a loading of the airplane wing.

11. The shape adaptive airfoil according to claim 10, wherein the toe angle of the blade section is manually selected.

12. The shape adaptive airfoil according to claim 10, wherein the toe angle is automatically selected based on one or more aircraft parameters.

13. The shape adaptive airfoil according to claim 12, wherein changes of the toe angle are automated based on one or more inputs from one or more sensors, the changes designed to alleviate loading of the airplane wing.

14. The shape adaptive airfoil according to claim 10, wherein a leading skin overlap enables movement of the second leading edge control structure, and wherein a trailing skin overlap enables movement of the second trailing edge control structure.

15. The shape adaptive airfoil according to claim 14, wherein the leading skin overlap and the trailing skin overlap are disposed on an outboard surface of the blade section, and wherein flexibility of an inboard surface of the blade section allows one or more internal actuators to move the leading skin overlap and the trailing skin overlap to manipulate the toe angle.

16. The shape adaptive airfoil according to claim 14, wherein the leading skin overlap allows an outboard surface of the second leading edge control structure to slide over an outboard surface of the blade section, and wherein the trailing skin overlap allows an outboard surface of the second trailing edge control structure to slide over the outboard surface of the blade section.

17. The shape adaptive airfoil according to claim 14, wherein portions of the leading skin overlap and the trailing skin overlap are configured to extend into an interior of the blade section.

18. The shape adaptive airfoil according to claim 1, wherein the radius section separates the first trailing edge control structure of the base section from the second trailing edge control structure of the blade section.

19. A shape adaptive airfoil configured to be coupled with a tip of an airplane wing, comprising:
    a blended winglet comprising:
        a base section extending from the airplane wing;
        a blade section projecting in a vertical direction above the base section; and
        a radius section interconnecting the base section and the blade section;
    the base section including a first leading edge control structure and a first trailing edge control structure designed to alter a camber of the base section; and
    the blade section including a second leading edge control structure and a second trailing edge control structure designed to alter a toe angle of the blade section.

20. The shape adaptive airfoil according to claim 19, wherein one or more skin overlaps enable the first leading edge control structure and the first trailing edge control structure to slide over a lower surface of the base section, and wherein a flexibility of an upper surface of the base section enables movement of the first leading edge control structure and the first trailing edge control structure relative to a plane of the base section.

21. The shape adaptive airfoil according to claim 19, wherein one or more skin overlaps enable outboard surfaces of the second leading edge control structure and the second trailing edge control structure to slide over an outboard surface of the blade section, and wherein a flexibility of an inboard surface of the blade section enables movement of the first leading edge control structure and the first trailing edge control structure relative to a plane of the blade section.

\* \* \* \* \*